(12) United States Patent
Chen et al.

(10) Patent No.: US 8,013,478 B2
(45) Date of Patent: Sep. 6, 2011

(54) POWER BANK APPARATUS

(75) Inventors: Shih-Hui Chen, Taoyuan Hsieh (TW); Chin-Tien Lin, Taoyuan Hsieh (TW)

(73) Assignee: Tennrich International Corp., Taoyuan Hsieh (TW)

( * ) Notice: Subject to any disclaimer, the term of this patent is extended or adjusted under 35 U.S.C. 154(b) by 140 days.

(21) Appl. No.: 12/173,876

(22) Filed: Jul. 16, 2008

(65) Prior Publication Data
US 2010/0190046 A1 Jul. 29, 2010

(30) Foreign Application Priority Data
Sep. 14, 2007 (TW) ................................ 96215486 U

(51) Int. Cl.
*H02J 7/00* (2006.01)
(52) U.S. Cl. .......................................... 307/155; 307/66
(58) Field of Classification Search .................... 307/66, 307/155
See application file for complete search history.

(56) References Cited

U.S. PATENT DOCUMENTS

| 7,406,623 | B2* | 7/2008 | Takahashi et al. | 714/14 |
| 2008/0137386 | A1* | 6/2008 | Jitaru et al. | 363/146 |
| 2009/0059636 | A1* | 3/2009 | Ho et al. | 363/146 |

* cited by examiner

*Primary Examiner* — Rexford N Barnie
*Assistant Examiner* — Hal I Kaplan
(74) *Attorney, Agent, or Firm* — Jackson IPG PLLC; Demian K. Jackson

(57) ABSTRACT

A power bank apparatus includes a power storage unit, a first power output port and a first power input port. The power storage unit is connected to the first power input and output ports. The power bank apparatus is connected to a controller through the first power output port. The controller includes a control unit, a second power input port and a second power output port. The control unit is connected to the second power input and output ports, and the second power input port is connected to the first power output port, and the control unit is provided for controlling an output voltage value of the second power output port.

7 Claims, 6 Drawing Sheets

POWER BANK APPARATUS

BACKGROUND OF THE INVENTION (a) Field of the Invention

The present invention relates to a power bank apparatus, and more particularly to a power bank apparatus capable of adjusting an output voltage automatically or manually to supply electric power to different electronic devices, so as to reduce the number of various adapters.

(b) Description of the Prior Art

As digital electronic products have become an indispensable part of our life, we often use digital electronic products such as digital cameras, digital photography equipments, and even MP4 digital audio/video players regardless of our requirements at home, in office, or on a tour or a business trip. For instance, users usually use digital cameras and MP4 players for fun and personal digital assistants or notebook computers for business, and thus the digital electronic products bring tremendous convenience to users.

As to those portable digital electronic products with no utility power supply, the power supply time of the battery becomes a big issue, and the battery manufactured by original manufacturers is too expensive and the power supply time is too short, and some of the batteries cannot be recharged during the use of the digital electronic product. Obviously, such digital electronic products cannot maximize their utility, and thus power bank is introduced to overcome this issue.

With reference to FIG. 1 for a structure of a general power bank 1, the power bank 1 includes a plurality of built-in chargeable batteries 11 and a transmission line 12 for connecting the power bank 1 with an electronic device 2 to supply electric power to the electronic device 2. To meet the voltage requirement for different digital electronic products, users need to buy many different power adapters for different output voltages, and thus causing inconvenience to users.

SUMMARY OF THE INVENITON

Therefore, it is a primary objective of the present invention to provide a power bank apparatus capable of adjusting an output voltage automatically or manually to supply electric power to different electronic devices, so as to reduce the number of various adapters.

To achieve the foregoing objective, the power bank apparatus of the invention comprises a power storage unit, a power input port and a power output port, and the power storage unit is connected to the power input and output ports. The power bank apparatus is connected to a connector through the first power output port. The controller includes a control unit, a second power input port, and a second power output port, and the control unit is connected to the second power input and output ports, and the second power input port is connected to the first power output port. The controller is provided for controlling an output voltage value of the second power output port manually or further connected to a detecting unit for detecting a required voltage of the connected electronic device automatically to adjust the output voltage value, so as to improve the practicability of the power bank apparatus and reduce the number of various adapters.

DETAILED DESCRIPTION OF THE PREFERRED EMBODIMENTS

Figure 1:
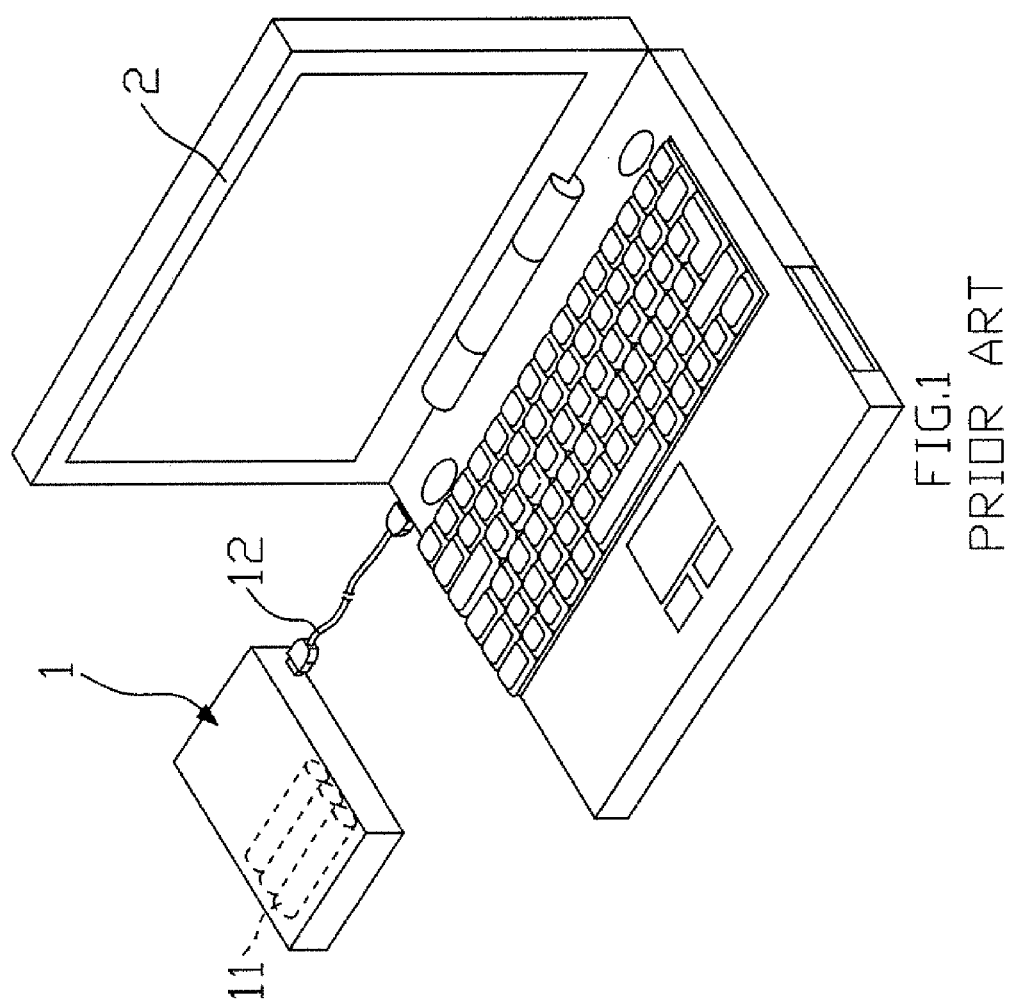
FIG. 1 is a schematic view of using a conventional power bank apparatus.
Figure 2:
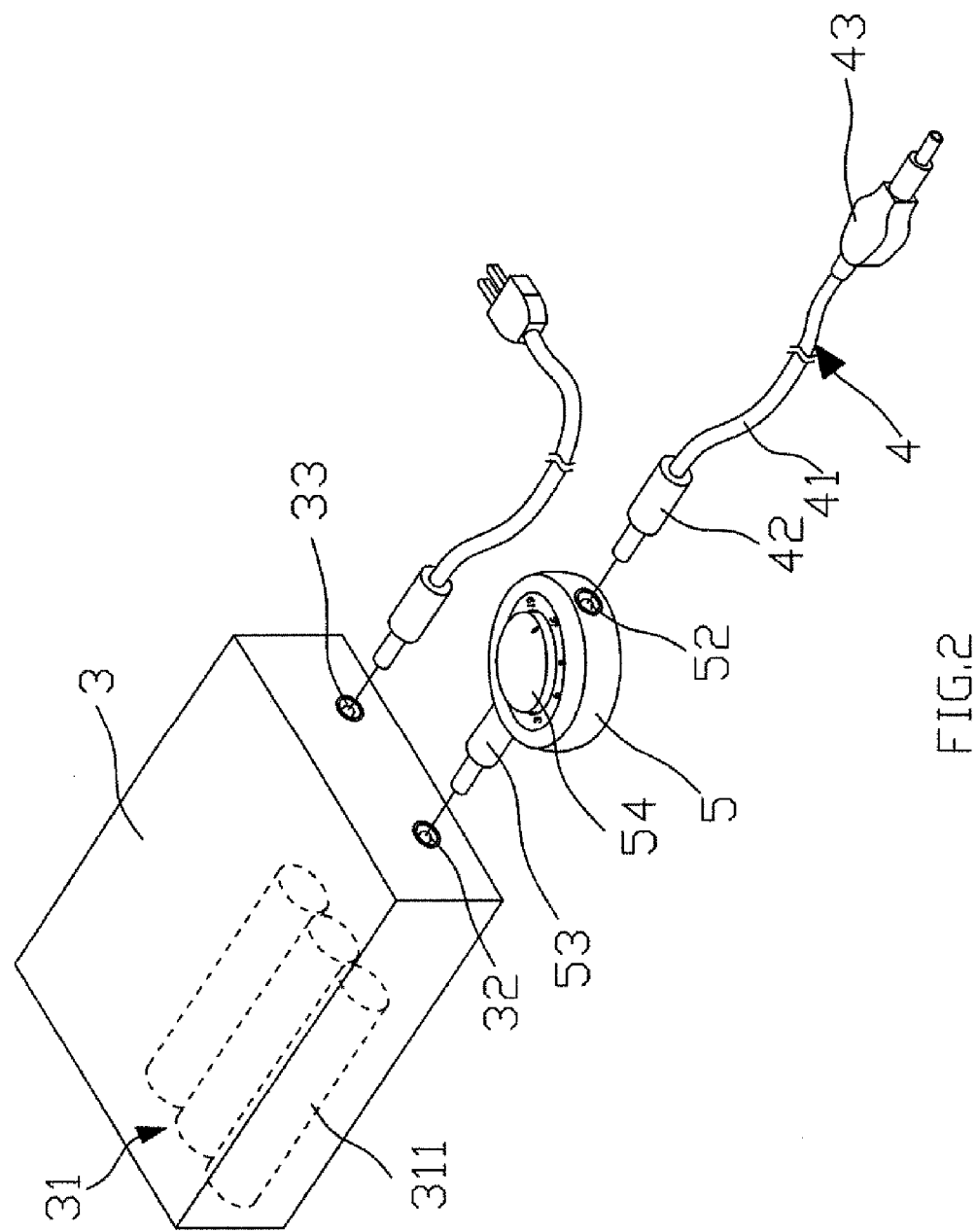
FIG. 2 is a schematic view of a power bank apparatus in accordance with a first preferred embodiment of the present invention.
Figure 3:
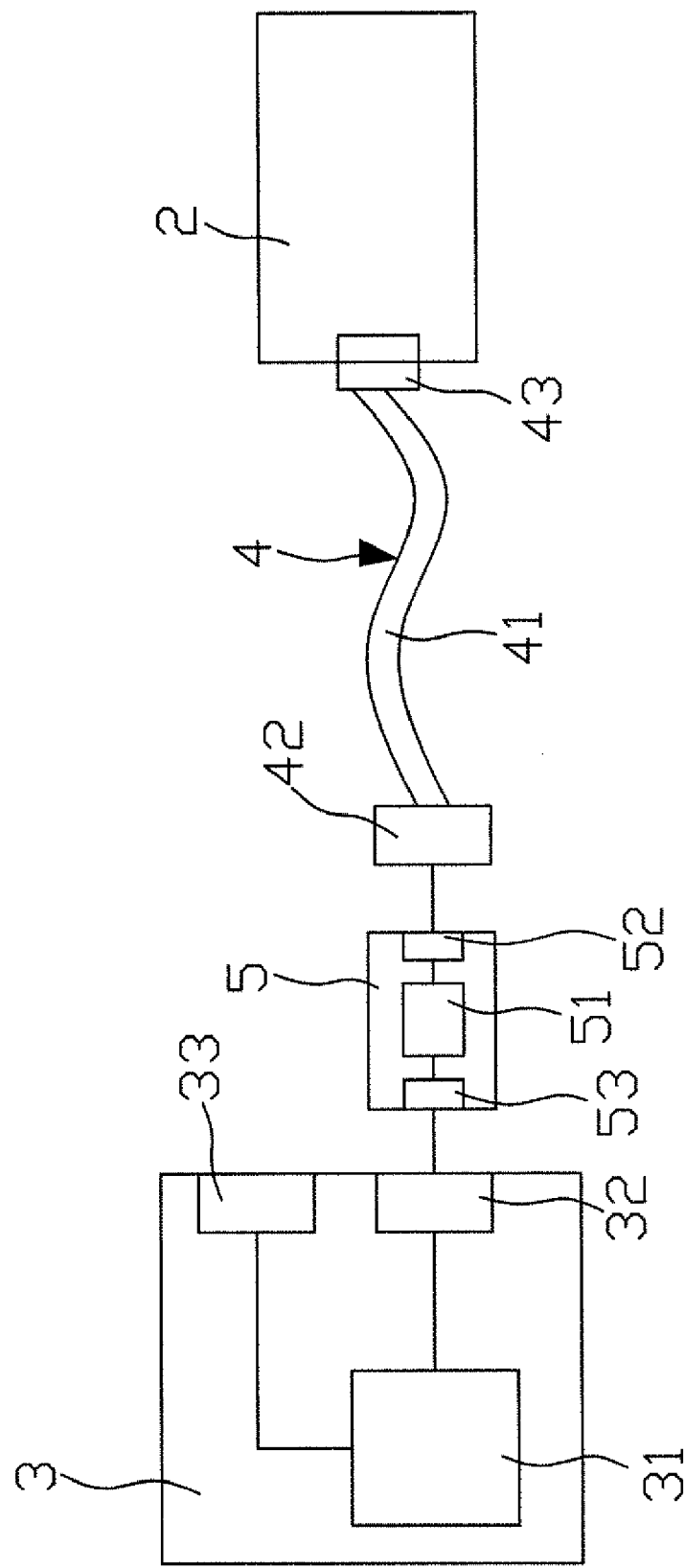
FIG. 3 is a structural block diagram of a power bank apparatus in accordance with a first preferred embodiment of the present invention.

With reference to FIGS. 2 and 3 for a power bank apparatus in accordance with a first preferred embodiment of the present invention, the power bank apparatus 3 comprises a power storage unit 31, a first power input port 33, and a first power output port 32. The power storage unit 31 includes a plurality of chargeable batteries 311, and the power storage unit 31 is connected to the first power input and output ports 33, 32.

The power bank apparatus 3 is connected to a controller 5 through the first power output port 32. The controller 5 includes a control unit 51, a second power input port 53 and a second power output port 52, and the control unit 51 is connected to the second power input and output ports 53, 52, and the second power input port 53 is connected to the first power output port 32, and the second power output port 52 is connected to an electronic device 2 through a connector module 4. The connector module 4 includes a cable 41 and a first connector 42 and a second connector 43 disposed on both ends of the cable 41 respectively, and the first and second connectors 42, 43 are connected to the second power output port 52 and the electronic device 2 respectively.

Figure 4:
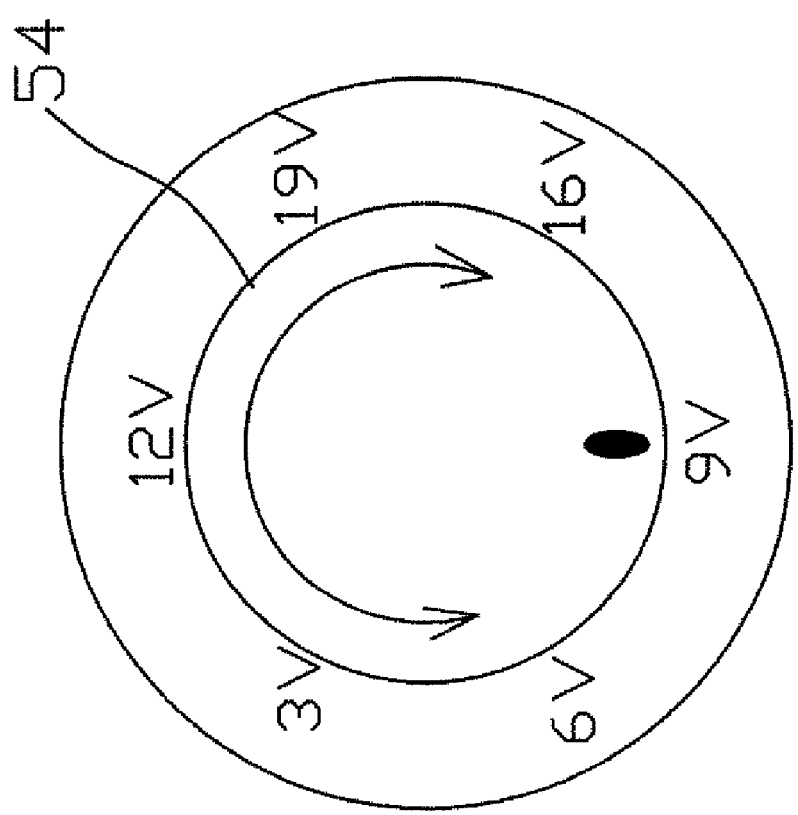
FIG. 4 is a schematic view of a control element in accordance with the present invention.

The power storage unit 31 supplies a power source to the first power output port 32, and then from the second power input port 53 to the control unit 51, and the control unit 51 controls an output voltage value of the second power output port 52. In a preferred embodiment as shown in the figure, the controller 5 has a control element 54 connected to the control unit 51, wherein the control element 54 is a turnable control element. With reference to FIG. 4 at the same time, the control element 54 can specify a plurality of different specific voltages. Of course, the control element can be an electronic press key representing a different voltage value.

When used, a user can adjust the control element 54 to a voltage value according to a desired voltage for charging the electronic device. For instance, if the required voltage of the electronic device is 9V, then the control element 54 is turned to the position of 9V (as shown in FIG. 4) and the connector module 4 is provided for connecting the second power output port 52 and the electronic device 2, and the control unit 51 follows the instruction of the control element 54 to supply a 9V voltage to the second power output port 52, and then from the connector module 4 to the electronic device 2 for its use.

Figure 5:
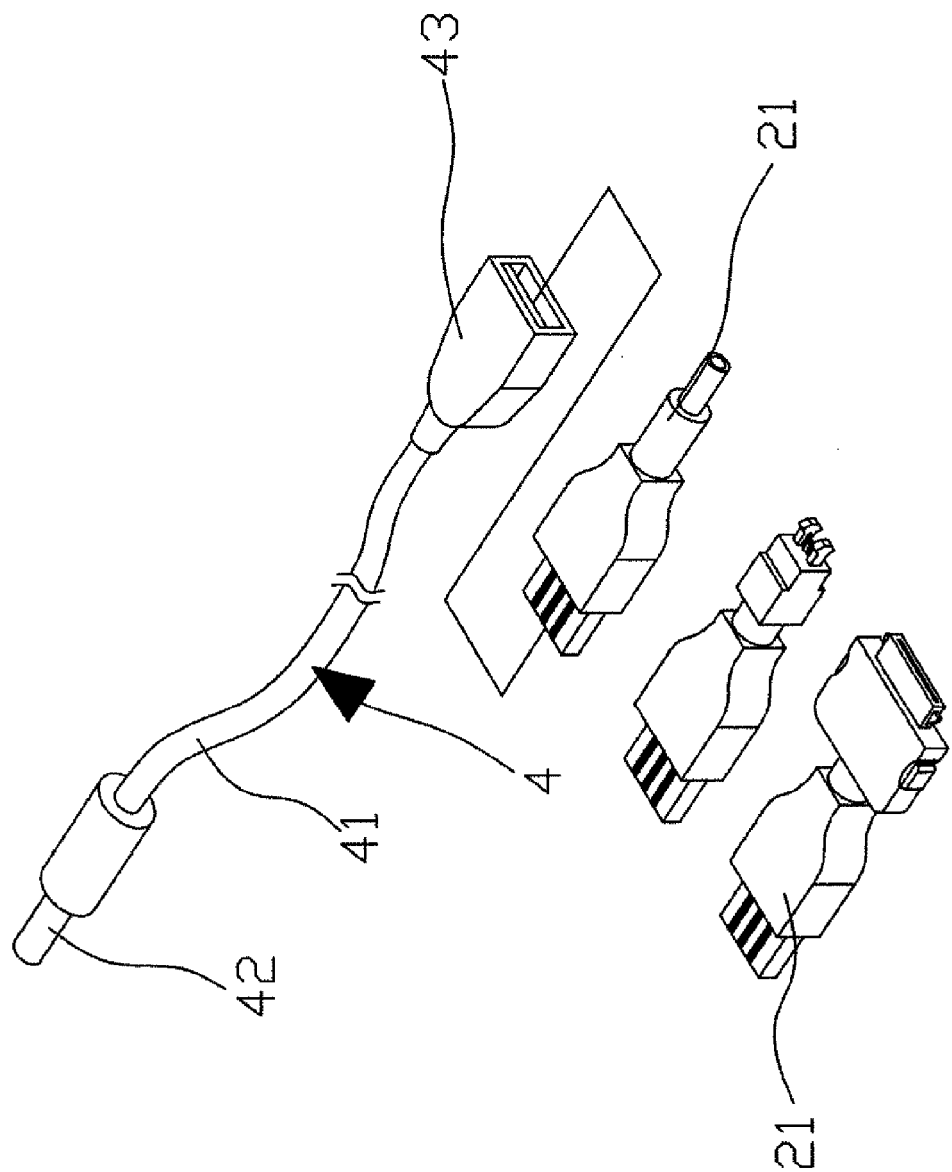
FIG. 5 is an exploded view of a connector module in accordance with the present invention.

Further, a plurality of interfaces are installed among different electronic devices as shown in FIG. 5, and the second connector 43 of the connector module 4 can be connected to a third connector 21 of the corresponding interface and provided for connecting different electronic devices.

Figure 6:
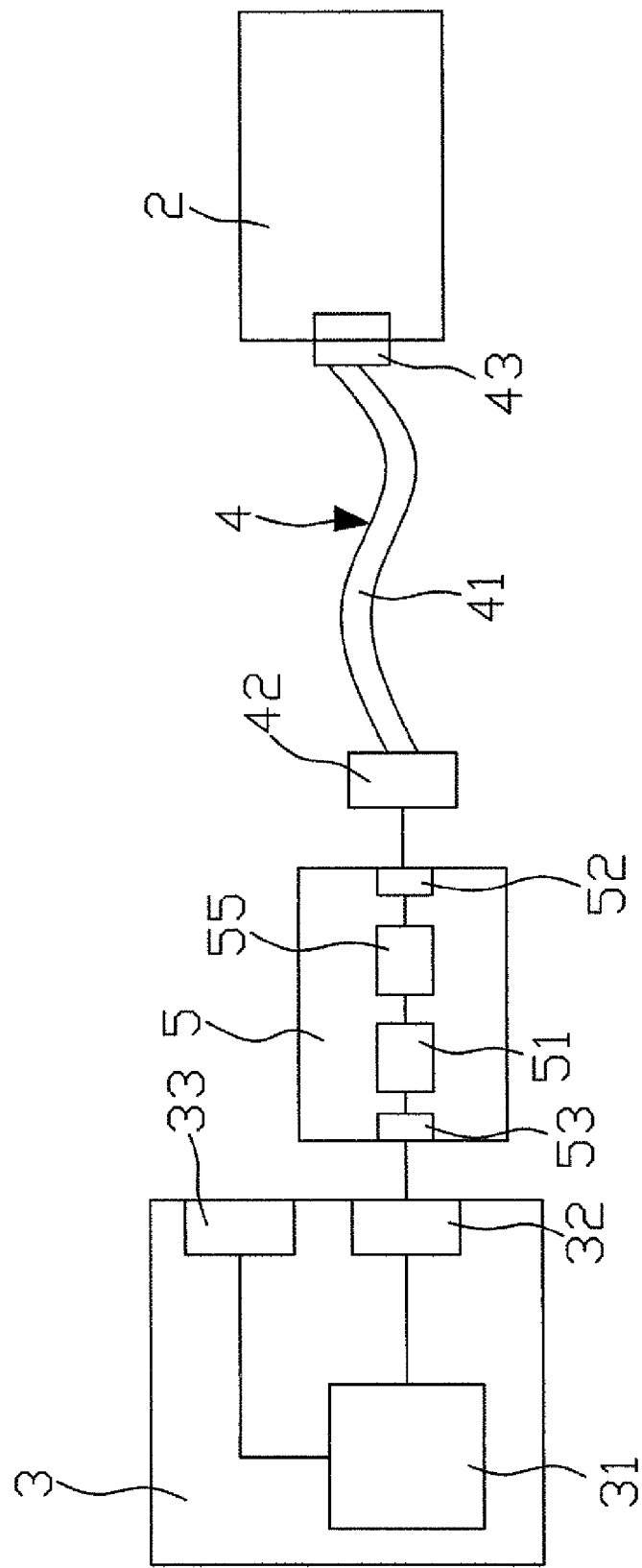
FIG. 6 is a structural block diagram of a power bank apparatus in accordance with a second preferred embodiment of the present invention.

With reference to FIG. 6 for a second preferred embodiment of the present invention, the controller 5 further includes a detecting unit 55 installed between the second power output port 52 and the control unit 51 for detecting the required voltage of the connected electronic device 2, and the control unit 51 can control an output voltage value of the second power output port 52. When used, the connector module 4 electrically connects the second power output port 52 and the electronic device 2, and the detecting unit 55 detects the required voltage of the electronic device 2 and transmits the voltage value to the control unit 51, and the control unit 51 controls the output voltage value of the second power output port 52.

Compared with the prior art, the present invention has the following advantages:

1. The output voltage of the power bank apparatus of the invention can be adjusted manually to supply a power output to different electronic devices such as portable computers, mobile phones, and PDAs.

2. The output voltage of the power bank apparatus of the invention can be adjusted automatically to supply a power output to different electronic devices such as portable computers, mobile phones, and PDAs.

The power bank apparatus of the invention can output various different voltages and save the trouble of preparing different adapters for different output voltages, and thus enhance the practicability of the power bank apparatus.

4. The connector module of the power bank apparatus is connected to connectors of different interfaces, and thus the power bank apparatus is applicable for connecting different interfaces.

While the invention is described in some detail herein below with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

We claim:

1. A power bank apparatus, comprising:
a first power input port;
a first power output port;
a power storage unit, coupled to the first power input and output ports; and
a controller, including a control unit, a second power input port and a second power output port, and the control unit being coupled to the second power input and output ports, and the second power input port being coupled to the first power output port, and the control unit controlling an output voltage value of the second power output port,
wherein the controller includes a control element, which is an electronic press key or a turnable control element.

2. The power bank apparatus of claim 1, wherein the second power output port is connected to an electronic device through at least one connector module for supplying power from the power storage unit to the electronic device.

3. The power bank apparatus of claim 2, wherein the controller further includes a detecting unit installed, between the second power input and output ports, for detecting a required voltage of the connected electronic device, and the control unit controls an output voltage value of the second power output port transmitted by the power storage unit.

4. The power bank apparatus of claim 2, wherein the connector module includes a cable, a first connector and a second connector coupled to both ends of the cable respectively.

5. The power bank apparatus of claim 4 further comprising a plurality of interfaces disposed among different electronic devices, wherein the second connector is connected to a third connector of a corresponding interface of the plurality of interfaces.

6. The power bank apparatus of claim 1, wherein the power storage unit includes a plurality of chargeable batteries.

7. A power bank apparatus, comprising:
a first power input port;
a first power output port;
a power storage unit, coupled to the first power input and output ports; and
a controller, including a control unit, a second power input port and a second power output port, and the control unit being coupled to the second power input and output ports, and the second power input port being coupled to the first power output port, and the control unit controlling an output voltage value of the second power output port,
wherein the second power output port is connected to an electronic device through at least one connector module for supplying power from the power storage unit to the electric power device,
wherein the controller further includes a detecting unit installed, between the second power input and output ports, for detecting a required voltage of the connected electronic device, and the control unit controls an output voltage value of the power output port transmitted by the second power storage unit.

* * * * *